3,301,911
PRODUCTION OF CYCLOPARAFFINS
Robert G. Boatright, Bartlesville, Okla., assignor to Phillips Petroleum Company, a corporation of Delaware
Filed Aug. 13, 1964, Ser. No. 389,349
5 Claims. (Cl. 260—666)

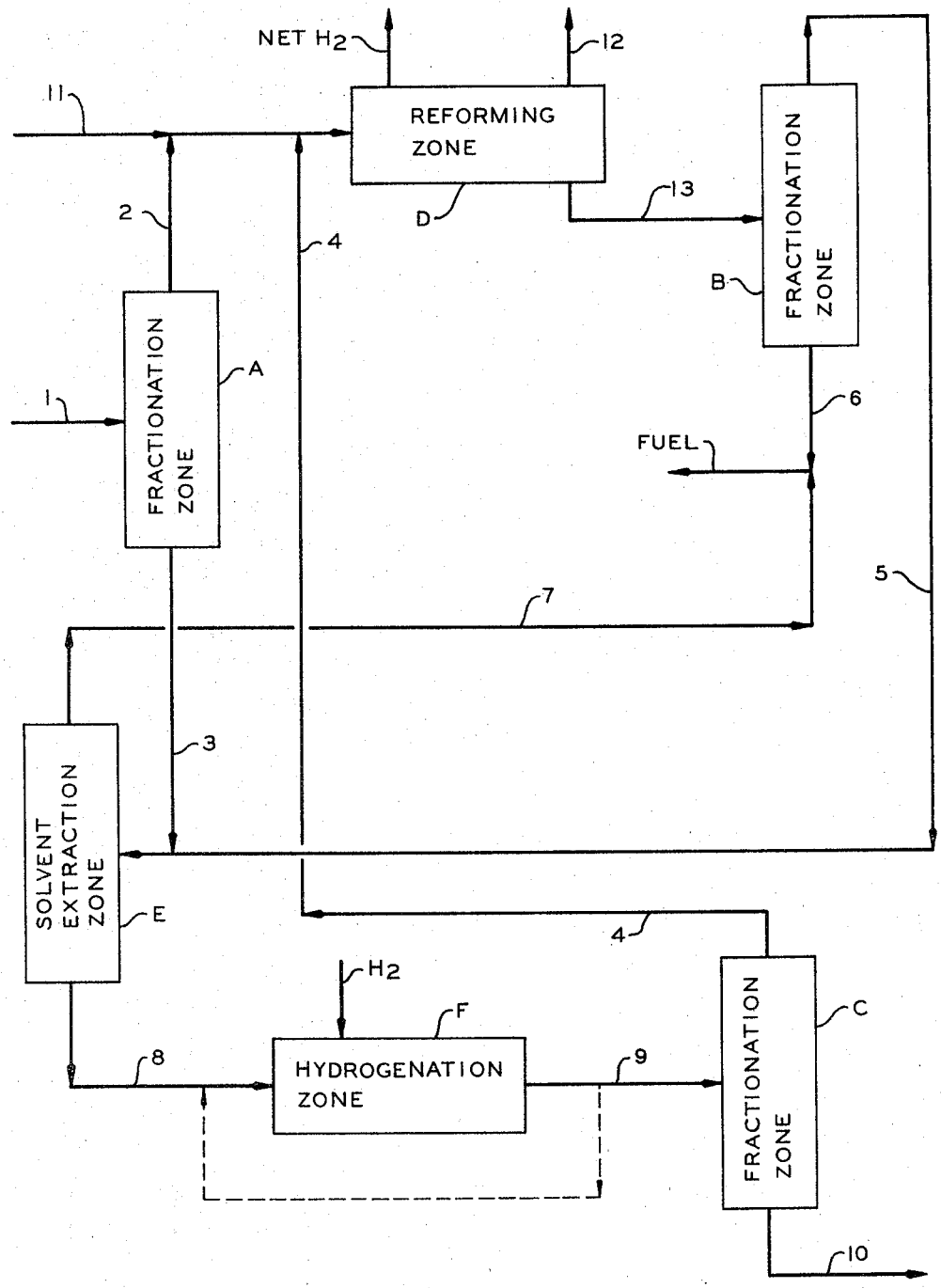

This invention relates to a method for the production of cycloparaffins. This invention also relates to apparatus for manufacturing cycloparaffins. One aspect of this invention relates to the production of high purity cycloparaffins from a cycloparaffin-containing feed by a first selective fractionation followed in order by reforming to increase the aromatic content, fractionating the reformate, extracting the fractionation overhead, hydrogenating the extract and fractionating the hydrogenate to separate out a very pure cycloparaffin. Another aspect of this invention relates to the process of forming cycloparaffins of high purity while contemporaneously forming a gasoline fraction by reforming a cycloparaffin and aromatic rich fraction to produce a fuel fraction and a further aromatic enriched cycloparaffin fraction, separating the two fractions and selectively solvent extracting said cycloparaffin fraction in the presence of added cycloparaffin product previously recovered from the cycloparaffin-containing feed, which cycloparaffin acts as a diluent in the subsequent hydrogenation operation so that same will, upon hydrogenation, produce a cycloparaffin of very high purity. Yet another aspect of this invention relates to substantially contemporaneously producing a high grade fuel product, purifying naturally-occurring cyclohexane, and producing additional cyclohexane all from the same hydrocarbon feed by practicing thereon a first fractionation of the hydrocarbon feed followed by reforming the fractionation overhead to produce a gasoline fraction, and a lighter fraction, solvent extracting the lighter fraction to produce, inter alia, an extract and hydrogenating the extract to produce a fractionable methylcyclopentane-cyclohexane mixture. Another aspect of this invention relates to fractionation as above wherein the methylcyclopentane produced by fractionating the methylcyclopentane-cyclohexane mixture is returned to the reforming operation and a high purity cyclohexane is recovered. Yet another aspect of this invention relates to a method and apparatus as above wherein additional hydrocarbon feed is added to the overhead of said first fractionation operation prior to entry of same into a reforming zone to increase the grade of fuel product. Yet another aspect of this invention relates to a method and apparatus as above in which the natural cycloparaffin-containing bottom flow of said first fractionation zone is added to the overhead from said fractionation of said reformate prior to entry of same into said selective solvent extraction zone.

There is an ever-increasing demand for chemicals and other materials of extremely high purity. It is desired to produce the maximum quantity of highest purity of these materials. Also, it is desired to operate at minimum investment and operating expenses in the production of these materials.

Attempts have been made in the past to produce high purity cycloparaffins. It is known to produce cyclohexane concentrate by treating cyclohexane plant feedstocks to a solvent extraction process followed by a distillation treatment of the raffinate followed by yet another solvent extraction of the cyclohexane concentrate produced by the afore-mentioned distillation treatment. It is also known to produce a cyclohexane concentrate from natural hydrocarbons by certain combinations of fractionation, hydrogenation and isomerization processes. It is also known to produce cyclohexane by catalytically reacting the benzene-hydrogen mixture, followed by flashing off excess hydrogen.

Although the above-mentioned processes have attained some degree of success, this invention involves a yet better method and apparatus for improving the yield and purity of cyclohexane product while simultaneously producing a high grade fuel fraction and reducing the size and operating costs of equipment pertinent to the process.

Accordingly, it is an object of this invention to produce high purity cyclohydrocarbons. It is another object of this invention to produce high purity cycloparaffins contemporaneously with the production of gasoline fraction. It is a further object of this invention to provide a relatively inexpensive, yet readily feasible, process for the production of high purity cyclohexane from naturally-occurring cyclohexane containing hydrocarbon feed. It is another object of this invention to recover normal cycloparaffin from a hydrocarbon feed while contemporaneously producing yet more cycloparaffin to improve the overall yield.

Other aspects, objects and several advantages of the invention are apparent from this description, the drawings and the appended claims.

According to the present invention, there are provided a process and apparatus for the production of a high purity cycloparaffin from a petroleum fraction containing cycloparaffin compounds. More specifically, a cycloparaffin, for example, cyclohexane, containing feedstock is fractionated to separate the naturally-occurring, or otherwise provided, cycloparaffin from lighter constituents, for example, benzene and methylcyclopentane. The lighter fraction is treated in a reforming process, preferably catalytic reforming which increases the concentration of desirable hydrocarbons, for example, benzene and isohexanes. This more desirable hydrocarbon concentrate is then fractionated to yield a fuel fraction and a lighter fraction of more desirable hydrocarbons relative to the desired high purity end result, for example, benzene. This lighter fraction is then treated to an extraction treatment, preferably solvent extraction, to yield a raffinate of paraffinic (including isomeric paraffinic) hydrocarbons which are desirably added to the fuel fraction mentioned above and an extract which, upon hydrogenation and fractionation, will yield a very pure cycloparaffin product.

Desirable modification to the above-described process is to add to the selectively fractionated distillate an additional hydrocarbon feed which would act as a further source of cycloparaffin or other desirable hydrocarbon that can be converted into a cycloparaffin. Such additional hydrocarbon feed can, for example, consist either wholly or in any desired part of the heavier isoheptanes and higher boiling hydrocarbons which are reformed in the reforming process into, among other components, additional benzene. The reformed isoheptanes and heavier stream in the subsequent fractionation would separate out with the fuel fraction, thus yielding a higher grade gasoline. Also, it should be noted that the primary feedstock may be of any suitable petroleum or other hydrocarbon feed which may or may not contain the cycloparaffin desired to be produced and purified. Finally, it should be noted that the cycloparaffin which is separated from the primary feedstock in the selective fractionation step is introduced into the solvent extraction process. The lighter isoheptanes in this naturally occurring cyclohexane are removed therefrom in the raffinate stream recovered from the solvent extraction step.

In order to more fully and completely disclose one embodiment of this invention, reference is made to the drawings wherein is diagrammatically shown a process for producing high purity cyclohexane utilizing a primary and secondary hydrocarbon feed in the vicinity of the discriminate feed fractionation area.

In the drawing, it can be seen that feed 1, comprising primarily isohexanes, normal hexane, cyclohexane, methylcyclopentane, benzene, dimethylpentanes, trimethylbutane, and other higher boiling isohepanes and heavier hydrocarbons is introduced into fractionation zone A. The overhead yield from fractionation zone A, comprising essentially benzene, methylcyclopentane, and normal hexane, is charged by 2 to reforming zone D. Additional hydrocarbon feed, for example isoheptanes and heavier, is mixed with the overhead fraction from fractionation zone A by means of conduit 11, and this mixture is then charged to a conventional reforming zone D. Reforming zone D can comprise a catalytic reforming operation such as Platforming, Houdriforming, Ultraforming and the like. Of course, reforming zone D can be non-catalytic (usually referred to as thermal). However, catalytic reforming is the preferred operation used in reforming zone D. In reforming zone D (Platforming zone) dehydrogenation, hydrocracking, isomerization, and dehydrocyclization are among those reactions occurring, as will be understood by those skilled in this art. For example, the methylcyclopentane is, in part, isomerized into cyclohexane which, in part, is dehydrogenated into benzene; normal hexane is cyclicized, in part, into cyclohexane which, in part, is dehydrogenated into benzene, etc. Within reforming zone D, hydrogen is separated from the reactor effluent and recycled, not shown, back to the reforming reactors. A portion of the hydrogen is removed from the operation as net hydrogen; and pentanes and lighter are also removed from the reformed hydrocarbon stream leaving six-carbon and higher hydrocarbons which are charged by 13 as feed to fractionation zone B. In fractionation zone B a bottoms yield, removed by 6, comprises a motor fuel product, and an overhead yield, removed by 5, comprising benzene, methylcyclopentane, normal hexane, isohexanes, and some cyclohexane. The fluid in conduit 5 is charged to a conventional solvent extraction zone E.

substantially free of paraffinic hydrocarbons such as the 2,2- and 2,4-dimethylpentanes, is passed by way of conduit 8 to a conventional hydrogenation zone F. This hydrogenation zone can be a catalytic zone using a hydrogenation catalyst such as nickel on Kieselguhr, as is known to those skilled in this art. In hydrogenation zone F, the benzene is converted into cyclohexane in the presence of the cyclohexane and methylcyclopentane diluent charged thereto in conduit 8, which diluent prevents too great of an increase in temperature in the exothermic hydrogenation process, which overheating, of course, can be disastrous, as in known by those versed in this field. The effluent from hydrogenation zone F is passed by 9 to fractionation zone C. Some of the cyclohexane-containing stream in conduit 9 can be recycled after cooling (not shown) to hydrogenation zone F in order to control the temperature therein and to prevent overheating therein. Fractionator C produces an overhead fraction comprising a methylcyclopentane concentrate which is passed by way of conduit 4 to the reforming operation noted above. The bottoms yield from fractionation zone C consists of a very pure cyclohexane product, and is recovered by conduit 10. It should be noted here that the additional feed indicated by reference 11 in the drawing need not be utilized or, if utilized, can be of any desirable composition which would be obvious to those skilled in the art. For example, various naphtha streams of low octane, e.g., boiling between about 175° F. to 400° F. can be charged to the reforming zone D. For example, a full boiling range straight run naphtha comprising isohexanes and heavier, up to about 400° F. end point, can be fractionated to remove the isohexanes. The normal hexanes and heavier stream can then be decyclohexanized to produce the feed hydrocarbon for fractionation zone A. The heavier isoheptanes and higher boiling (up to 400° F. end point) can be used as the charge stock 11 added to the reforming zone D.

EXAMPLE I.—LIQUID VOLUME PERCENTS

|  | 1 (Feed) | 2 "A" Overhead | 3 "A" Bottom | 4 "C" Overhead | 5 "B" Overhead | 6 "B" Bottom | 7 Raffinate | 8 Extract | 10 CyC$_6$ Product | 11 Isoheptane plus Feed | 12 Reformer Light Ends |
|---|---|---|---|---|---|---|---|---|---|---|---|
| Normal pentane and lighter | 0 | 0 |  |  |  |  | 0 |  |  |  | 100.0 |
| Isohexanes | 5.4 | 6.3 |  |  | 30.9 |  | 59.5 |  |  |  |  |
| Normal Hexane | 42.6 | 49.6 |  |  | 16.7 |  | 32.1 |  |  |  |  |
| Methylcyclopentane | 30.4 | 35.4 |  | 100.0 | 22.5 |  | 0 | 35.4 |  |  |  |
| Benzene | 7.5 | 8.7 |  |  | 27.0 |  | 0 | 42.5 |  |  |  |
| Cyclohexane | 10.1 |  | 71.7 |  | 2.9 |  | 0 | 22.1 | 100.0 |  |  |
| 2,2-, 2,4-DMP; 2,2,3-TMB | 2.7 |  | 19.4 |  |  |  | 5.8 |  |  |  |  |
| Isoheptanes plus | 1.3 |  | 8.9 |  |  | 100.0 | 2.6 |  |  | 100.0 |  |
|  | 100.0 | 100.0 | 100.0 | 100.0 | 100.0 | 100.0 | 100.0 | 100.0 | 100.0 | 100.0 | 100.0 |
| Total Barrels per day | 4,330 | 3,720 | 610 | 890 | 3,940 | 9,130 | 2,040 | 2,500 | 1,840 | 10,140 | 1,460 |
| Boiling Range, °F | 120-200 |  |  |  |  | 200-320 | 120-200 |  |  | 200-310 |  |

Prior to entry into solvent extraction zone E, the overhead from fractionation zone B is admixed with the bottoms yield from fractionation zone A, by 3. The hydrocarbon stream in conduit 3 comprises a natural cyclohexane concentrate having 2,2-dimethylpentane, and 2,4-dimethylpentane therein which hydrocarbons, as is known, are very difficultly separable from cyclohexane by fractional distillation methods. Within solvent extraction zone E, using conventional solvents for aromatic and naphthenic hydrocarbons, examples of such solvents being triethylene glycol, diethylene glycol, sulfolane, etc., there is produce a raffinate phase comprising primarily 2,2- and 2,4-dimethylpentanes, isohexanes, normal hexane, and the higher boiling isoheptanes and heavier, which after solvent removal (not shown) are removed through 7 and admixed with the above-mentioned motor fuel fraction from fractionation zone B. The extract phase from solvent extraction zone B, after separation from the solvent (not shown), comprising primarily benzene, cyclohexane, and methylcyclopentane mixture which is It should be noted here that the numbers at the top of each column in the above example correspond with the same number found in the drawing.

It can be seen from the above example, that from a feed containing little more than 430 barrels of cyclohexane, a product comprising 100 percent cyclohexane is produced in an amount of 1840 barrels. The naturally occurring cyclohexane in the feed is not charged to the reforming zone D since a portion of this cyclohexane would be converted therein into products other than cyclic hydrocarbons with six carbon atoms. A portion of the cyclohexane would remain unconverted in the reforming zone D but is normally recovered with the motor fuel because of the expense of further processing. Also, a portion would be converted into methylcyclopentane which also may go to motor fuel along with the cyclohexane. Instead of charging the natural occurring cyclohexane to the reforming zone D, it is charged by way of fractionation zone A directly to the solvent extraction zone E, as above detailed. Also the isohexanes are not charged to reforming zone D because of their effect on suppressing the conversion of normal hexane into isohexanes. The isohexanes are recovered, not shown, from feed prior to fractionation zone A and can be blended with the motor fuel in conduits 7 and/or 6, not shown. The heavier isoheptanes (not including the 2,2- and 2,4-dimethylpentanes) and heavier hydrocarbons are charged to reforming zone D to produce among other products additional benzene therefrom. Thus, by the combination of steps disclosed by this invention an improved yield of high purity cyclohexane is achieved. Also, due to the above and other advantages, the size, and thus initial cost, of certain units and appurtenant facilities utilized in the process, for example, the hydrogenation unit or the catalytic reformer, can be reduced since equipment size and volume of recycle cyclohexane are proportional to the volume of benzene converted rather than to the volume of cyclohexane product and since the volume of hexane rings to be processed is significantly reduced. The above-mentioned volume reductions not only decrease the cost of the equipment originally but also significantly decrease the operating cost, thus engendering a long term savings. From the foregoing, it is seen that large yields of very pure material are achieved, which material is suitable for use as a chemical intermediate in the manufacture of products, for example, nylon.

Reasonable variation and modifications are possible within the scope of the foregoing disclosure, the drawings and the appended claims to the invention the essence of which is there have been provided a process and apparatus for producing high purity cycloparaffins by selectively fractionating the cycloparaffin-containing feed, recovering the cycloparaffin concentrate with a lighter hydrocarbon fraction which fraction is reformed and fractionated to produce a benzene-rich hydrocarbon stream which, when combined with the cycloparaffin concentrate and subjected to solvent extraction, results in an extract which upon hydrogenation and fractionation produces a high purity cycloparaffin.

I claim:

1. A method for producing at least one high purity cycloparaffin comprising providing a feed stock containing at least one cycloparaffin, at least one alkyl substituted cycloparaffin, and at least one aromatic, fractionating said feed stock to at least separate therefrom cycloparaffin, thereby leaving a residual product containing alkyl substituted cycloparaffin, reforming said residual product to convert the alkyl substituted cycloparaffin to aromatic and thereby form a reformate rich in aromatic, combining the cycloparaffin separated from the feed stock by fractionation and the aromatic rich reformate, solvent extracting said combination of cycloparaffin and reformate to produce an extract rich in aromatic and cycloparaffin, hydrogenating said extract to convert the aromatic to cycloparaffin and produce a hydrogenate, fractionating the hydrogenate to separate lighter materials from said cycloparaffin, and recovering said cycloparaffin as the product of the process.

2. The method according to claim 1 wherein said reformate is fractionated before being combined with the cycloparaffin separated from the feed stock by fractionation, said fractionation of said reformate producing a bottom fuel fraction and an overhead aromatic rich fraction, and said lighter material separated from the hydrogenate by fractionation is returned as additional feed to said reforming step.

3. The method according to claim 1 wherein said feed stock comprises normal pentanes and lighter, normal hexane, isohexane, methylcyclopentane, benzene, cyclohexane, dimethylpentanes, trimethylbutanes, and isoheptanes and heavier, the cycloparaffin containing fraction separated from the feed stock contains normal pentanes and lighter, isohexanes, normal hexanes, methylcyclopentane, and benzene; said residual product contains cyclohexane, dimethylpentanes, trimethylbutanes, and isoheptanes and heavier; said reforming step converts methylcyclopentane to benzene and normal pentanes and lighter are separated from the system by way of the reforming step; the cyclohexane, dimethylpentanes, trimethylbutanes, and isoheptanes and heavier fraction separated from the feed stock by the fractionation step are combined with the reformate obtained from the reforming zone, the reformate containing isohexane, normal hexane, methylcyclopentane, cyclohexane, and benzene; the solvent extraction step of said combination produces a raffinate containing isohexane, normal hexane, dimethylpentanes, trimethylbutanes, isoheptanes and heavier and an extract containing cyclohexane, benzene, and methylcyclopentane; the hydrogenation zone converts benzene to cyclohexane; and the fractionation of the hydrogenate separates methylcyclopentane from the cyclohexane, the cyclohexane being obtained from the bottom of the fractionation zone as the product of the method; and the methylcyclopentane separated from the cyclohexane is returned as additional feed material for the reforming step.

4. A method according to claim 1 wherein additional feed stock is added to said residual product upstream of said reforming step.

5. A method according to claim 1 wherein cyclohexane constitutes the cycloparaffin, benzene constitutes the aromatic, methylcyclopentane constitutes the alkyl substituted cycloparaffin, and cyclohexane constitutes the product.

References Cited by the Examiner
UNITED STATES PATENTS
3,211,797 10/1965 Houston _____ 260—666

DELBERT E. GANTZ, *Primary Examiner.*

V. O'KEEFE, *Assistant Examiner.*